UNITED STATES PATENT OFFICE.

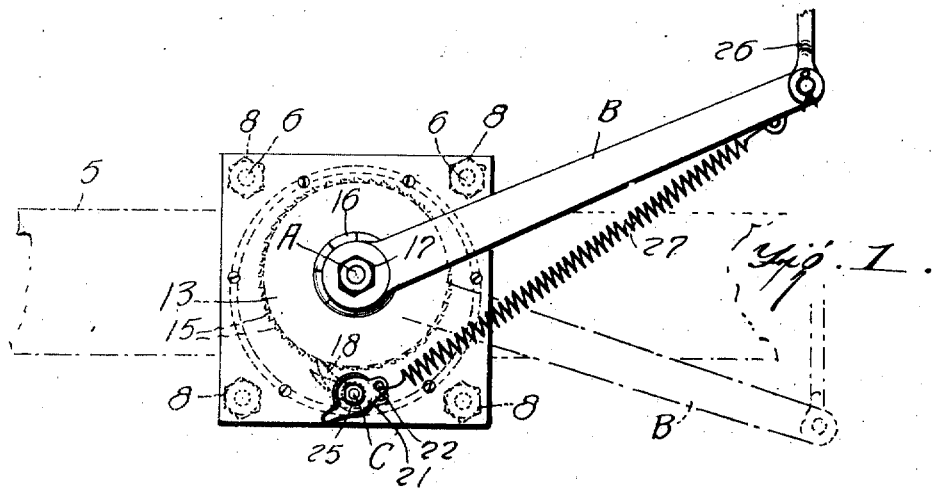
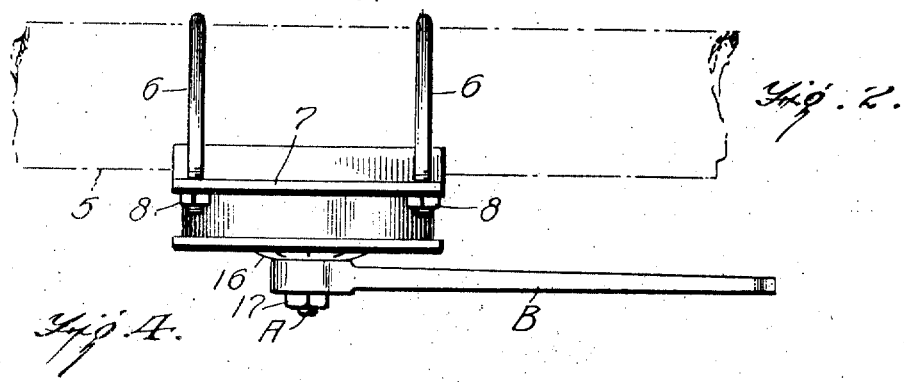
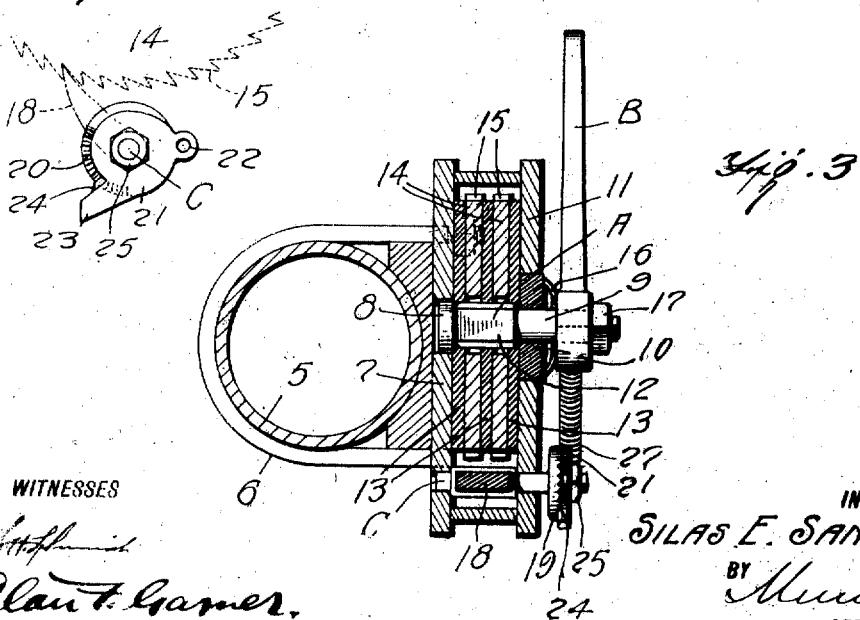

SILAS E. SANDERSON, OF TOWN CREEK, ALABAMA.

SHOCK-ABSORBER.

1,249,210.    Specification of Letters Patent.    Patented Dec. 4, 1917.

Application filed February 1, 1917. Serial No. 145,892.

*To all whom it may concern:*

Be it known that I, SILAS E. SANDERSON, a citizen of the United States, and a resident of Town Creek, in the county of Lawrence and State of Alabama, have invented a certain new and useful Improvement in Shock-Absorbers, of which the following is a specification.

One of the principal objects of the invention is to provide an improved shock absorber adapted for use in connection with road vehicles, particularly automobiles, so designed that, while it will not prevent the springs of the vehicle from yielding to the roughness and unevenness of the road, it will prevent the springs from violently rebounding, and hence will cause the springs to come back to their normal position without any unpleasant jerk or jar, thus preventing wear and tear on the car and at the same time adding greatly to the comfort of the passengers.

Another object of the invention is to provide an improved shock absorber which is adjustable to take up rebound in cars of various weight and under various loads.

Still another object of the invention is to provide an improved shock absorber of the class described, which will be extremely simple, durable, efficient in operation, and inexpensive to manufacture.

With these and other objects in view which will become apparent as the description proceeds, the invention resides in the construction, combination, and arrangement of parts hereinafter more fully described and claimed, and illustrated in the accompanying drawing, in which like characters of reference indicate like parts throughout the several figures, of which—

Figure 1 represents a view in elevation of a shock absorber constructed according to my invention, showing the same in place on one of the axles of a car;

Fig. 2 represents a top plan view thereof;

Fig. 3 represents a view in section taken vertically and transversely through the device;

Fig. 4 represents an enlarged elevational view of the adjustable actuating means for the pawl.

Referring more particularly to the drawing, 5 indicates the axle of an automobile on which the shock absorber is mounted. Some suitable means is employed for securing the device in place on the axle, such for instance as the clips 6 extending around the axle and having their free ends passed through openings in the base plate 7 of the shock absorber, and tightened up with nuts 8.

Extending centrally through the casing is a pin A having at its inner end a head 8 adapted to rotate in an opening provided in the base plate 7 of the casing, the outer end of the pin being reduced as at 9 and journaled for rotation in a collar 10 which sets within an opening provided in the outer plate 11 of the casing. The portion of pin A between the head 8 and reduced portion 9 is squared as at 12, and fitting on this squared portion at spaced intervals apart, and rotatable with the pin, are the friction plates or disks 13. Intermediate the plates 13 are disposed the ratchet plates 14, such plates being rotatable relatively to the pin A, and being equipped at their peripheries with ratchet teeth 15 which extend slightly beyond the peripheries of the friction plates 13.

On the reduced portion 9 of the pin, outside of the casing, is feathered or otherwise arranged in such manner as to be adjusted longitudinally of the pin, the inner end of a lever B. Arranged on the pin between the lever and collar is a spring washer 16, and a nut 17 is threaded on the outer end of the pin. When it is desired to increase the frictional engagement between the friction plates 13 and the ratchet plates 14, the nut 17 is tightened up whereby to tighten the washer 16 against the collar, and hence increase the frictional engagement of the said plates.

Extending through the casing below the pin A and beyond the periphery of the disks, is a shaft C which carries a pawl 18, adapted to be moved as the shaft is oscillated into and out of engagement with the ratchet teeth 15 on disk or plate 14. The outer end of shaft C extends beyond the casing, and has fixed thereto a plate 19 provided on its outer surface with a series of teeth 20. Loosely mounted on the shaft above the plate 19 is an adjustable lever in the nature of a plate or disk 21, having an eye 22 on one side and having a finger 23 provided on its opposite side, said finger being equipped with a downturned tooth 24 adapted to coact with the series of teeth 20 in retaining the plate 21 in adjusted position relatively to the plate 19. A nut 25 threaded upon the outer end of shaft C against the plate 21 serves to bind the latter in adjusted position. Connecting the outer end of lever B with the eye 22 on plate 21, is a spring 27, which spring is adapted to move the shaft C as the lever B is moved, for shifting the pawl 18 into and out of engagement with the ratchet teeth 15. The outer end of lever B is connected by means of a rod or link 26 with the body of the vehicle.

The operation of the device may be briefly described as follows: As the vehicle body moves up and down relatively to the axle, under the action of the vehicle springs, the link 26 transmits an up and down movement to the lever B. The lever or plate 21 is so adjusted relatively to the plate 20 that the ordinary movements of the vehicle, as transmitted to the lever B, will not effect engagement of the pawl 18 with the teeth on the ratchet disks. When, however, under the influence of an excessive contraction of the vehicle springs, the body of the vehicle moves downwardly to a greater extent than usual, the shaft C will be turned enough to engage the pawl with the teeth on the ratchet disks, and when the vehicle body starts to move upwardly under the influence of the rebound of the springs, the ratchet disks will be held against rotation with the friction plates 13, and hence these plates will rotate relatively to the ratchet disks, and the frictional retardation thus encountered by the plates 13 will serve to tone down and modify the rebound of the vehicle body, so that no shock or jar will be felt by the passengers. As the lever B moves again into normal position, the spring 27 will shift the shaft C in such direction as to move the pawl 18 away from the ratchet teeth, whereby to again allow movement of the ratchet disks with the friction disks. It will of course be understood that during the movements of the lever B through its normal path, the ratchet disks 14, being frictionally engaged by the friction disks 13, will move with these disks, so that the normal action of the vehicle springs will in no way be retarded. It is only on the rebound, after an excessive concussion of the springs, that the ratchet disks are held by the pawl against rotation, whereby to soften and tone down the rebound.

The housing or casing is preferably made tight enough to hold grease, so that the parts will be thoroughly protected, not only from grit and dust, but also from rust and erosion.

Although I have described the preferred embodiment of my invention, I may desire to make such changes in the construction, combination, and arrangement of parts thereof, as do not depart from the spirit of the invention and the scope of the appended claims.

I claim:—

1. In a shock absorber, the combination of a casing, a pin rotatably extending therethrough, friction disks mounted within the casing for rotation with the pin, ratchet disks frictionally engaged between the friction disks and loosely surrounding the pin, said ratchet disks being provided with ratchet teeth extending beyond the periphery of the friction disks, a shaft mounted for rotation in the casing below the said pin, a pawl carried on and movable by said shaft, into and out of engagement with the ratchet teeth, a plate mounted on the shaft for actuating the same, means whereby the plate may be adjusted circumferentially of the shaft, a lever mounted on the pin for actuating the said pin, and a spring connected at one end with the said plate adjacent the periphery thereof, and at its opposite end with the said lever adjacent the outer end of the latter.

2. In a shock absorber, the combination of a casing, a pin rotatably mounted therein, friction disks mounted for rotation with the pin, ratchet disks frictionally engaged between the friction disks and loosely mounted on the pin, said ratchet disks being provided with ratchet teeth extending beyond the periphery of the friction disks, a shaft mounted for rotation below the said pin, a pawl carried on the shaft and movable thereby into and out of engagement with the ratchet teeth, a plate mounted on the shaft for actuating the same, means whereby the plate may be adjusted circumferentially of the shaft, a lever mounted on the pin for actuating said pin, and a spring connected at one end with the said plate adjacent the periphery thereof, and at its other end with the said lever adjacent the outer end of the latter.

3. In a shock absorber, the combination of a pin, means for rotatably supporting the pin, a ratchet disk loosely surrounding the pin, said ratchet disk being provided with ratchet teeth on its periphery, means movable with the pin for frictionally engaging the ratchet disk, a pawl mounted beyond the ratchet disk and adapted to be moved into and out of engagement with the ratchet teeth, a plate for actuating the pawl, said plate being adjustable about the axis of rotation of the pawl, a lever mounted on the pin for actuating the latter, and a spring connected at one end with the plate beyond the axis of rotation of the pawl, and at its other end with the lever beyond the axis of rotation of the pin.

4. In a shock absorber, the combination of a rotatable pin, a ratchet disk provided with ratchet teeth rotatable relatively to the pin, means carried by the pin for frictionally engaging the ratchet disk, a lever mounted on the pin for actuating the latter, a pawl movable into and out of engagement with the teeth on the ratchet disk, a lever adjustable relatively to the pawl for actuating said pawl, and means connecting the two levers whereby motion may be imparted to the second said lever from the first said lever.

5. In a shock absorber, the combination of a rotatable pin, a lever mounted on the pin for oscillating said pin, a ratchet disk loosely surrounding the pin, means carried by the pin and movable therewith for frictionally engaging the ratchet disk, means for engaging the ratchet disk for holding the same against rotation when the pin is moved in one direction beyond certain limits, and means connected with the said lever for actuating the last said means.

6. In a shock absorber, the combination of a pin mounted for oscillation, a lever mounted on the pin for actuating the latter, a plate with relation to which the pin is movable, means movable with the pin for frictionally engaging the plate, a pawl movable into engagement with the plate for holding the said plate against movement when the pin is moved beyond certain limits in one direction, and means connected with said lever for actuating the pawl.

SILAS E. SANDERSON.

Witnesses:
J. M. HOUSTON,
C. G. GREEN.